United States Patent
Narita

(10) Patent No.: US 9,400,947 B2
(45) Date of Patent: Jul. 26, 2016

(54) PRINTING CONTROL METHOD, PRINTING CONTROL APPARATUS, AND COMPUTER-READABLE RECORDING MEDIUM

(71) Applicant: CANON KABUSHIKI KAISHA, Tokyo (JP)

(72) Inventor: Hirofumi Narita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/623,989

(22) Filed: Feb. 17, 2015

(65) Prior Publication Data

US 2015/0161490 A1  Jun. 11, 2015

Related U.S. Application Data

(63) Continuation of application No. 12/748,033, filed on Mar. 26, 2010, now Pat. No. 8,982,410.

(30) Foreign Application Priority Data

Mar. 30, 2009 (JP) ................................. 2009-082084

(51) Int. Cl.
  *G06K 15/00* (2006.01)
  *G06K 15/02* (2006.01)
  *H04N 1/00* (2006.01)
  *H04N 1/387* (2006.01)

(52) U.S. Cl.
  CPC ........ *G06K 15/1868* (2013.01); *G06K 15/1897* (2013.01); *H04N 1/00413* (2013.01); *H04N 1/00421* (2013.01); *H04N 1/00442* (2013.01); *H04N 1/00456* (2013.01); *H04N 1/00466* (2013.01); *H04N 1/387* (2013.01); *H04N 2201/0082* (2013.01)

(58) Field of Classification Search
  None
  See application file for complete search history.

(56) References Cited

U.S. PATENT DOCUMENTS

| | | | | |
|---|---|---|---|---|
| 5,732,403 A * | 3/1998 | Nakamura | .............. | G06F 17/24 399/81 |
| 5,960,229 A * | 9/1999 | Fukuoka | ............ | H04N 1/00681 358/488 |
| 7,170,631 B2 * | 1/2007 | Sakura | .................. | G06F 3/1208 358/1.15 |
| 7,180,608 B1 * | 2/2007 | Yu | ......................... | G06F 3/1204 358/1.1 |
| 7,319,539 B2 * | 1/2008 | Yamamura | ............ | G06F 3/1204 358/1.12 |
| 7,386,269 B2 * | 6/2008 | Miyazaki | ............... | B65H 45/12 399/381 |
| 7,679,775 B2 * | 3/2010 | Tsukuba | ................ | B65H 45/12 358/1.18 |
| 2001/0039554 A1 * | 11/2001 | Iwasaki | ................. | G06F 17/217 715/234 |
| 2003/0189718 A1 * | 10/2003 | Yamamura | ............ | G06F 3/1204 358/1.13 |
| 2007/0229903 A1 * | 10/2007 | Sato | ...................... | G06F 3/1208 358/1.18 |
| 2007/0287622 A1 * | 12/2007 | Kato | ..................... | B65H 35/00 493/424 |

* cited by examiner

*Primary Examiner* — Dung Tran
(74) *Attorney, Agent, or Firm* — Canon U.S.A., Inc. IP Division

(57) ABSTRACT

A printing control method for printing an image onto a recording medium including inputting data to be used for printing a page, setting a position and a size of a margin for a plurality of pages represented by the input data, according to an instruction from a user, and causing a print device to print an image including the plurality of pages and in which the binging margin with the set width is arranged at the set position, onto the recording medium in a direction determined according to the width of the margin.

25 Claims, 9 Drawing Sheets

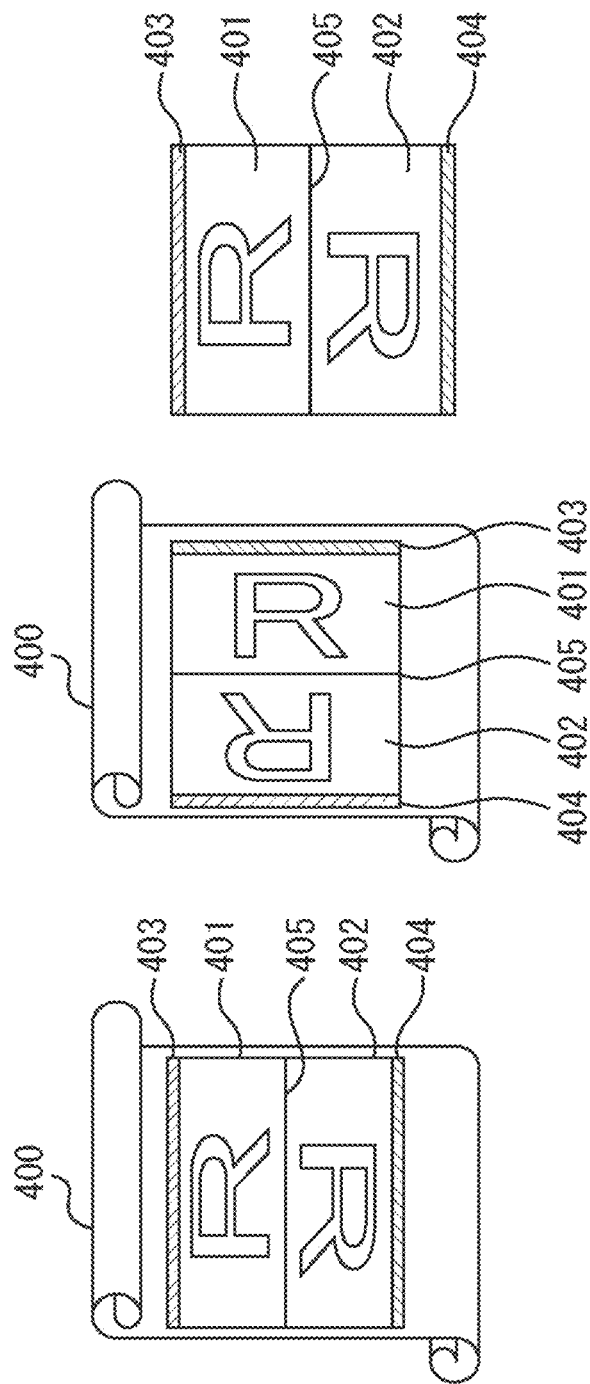

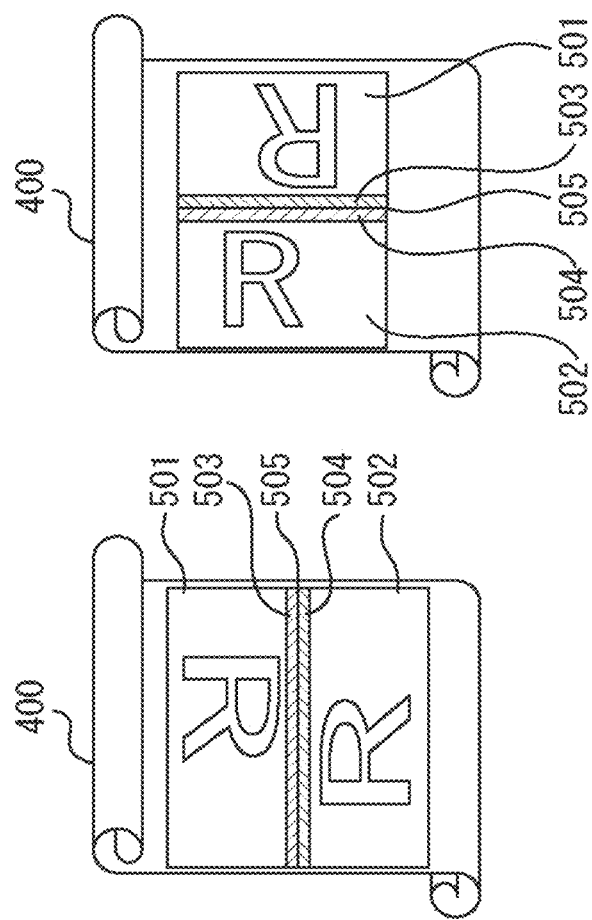

PRINTING CONTROL METHOD, PRINTING CONTROL APPARATUS, AND COMPUTER-READABLE RECORDING MEDIUM

The present application is a continuation of U.S. patent application Ser. No. 12/748,033, filed on Mar. 26, 2010, entitled "PRINTING CONTROL METHOD, PRINTING CONTROL APPARATUS, AND COMPUTER-READABLE RECORDING MEDIUM FOR SETTING A BINDING MARGIN", the content of which is expressly incorporated by reference herein in its entirety. Further, the present application claims priority from Japanese Patent Application No. 2009-082084 filed Mar. 30, 2009, which is hereby incorporated by reference herein in its entirety.

BACKGROUND OF THE INVENTION

1. Field of the Invention

The present invention relates to a printing control method and a printing control apparatus for printing an image onto a recording medium.

2. Description of the Related Art

There has conventionally been known a method in which a layout of a print is determined in anticipation of a condition that a printed sheet is used in a folded state. For example, in a bookbinding print technique for forming a booklet, an image is laid out on the assumption that the print sheet is folded back at its center. For example, WO 2007/058390 discusses a print method in which when a print sheet, having a print image printed on one side, is folded back by a user, a printed result that appears as a pseudo two-sided print can be obtained (the print method described above is referred to as a folding two-sided print below). The print method described above is utilized for an advertising poster that is hung down from a ceiling, and that is mostly used in a mass merchandiser market and the like.

In the technique of making a layout on the assumption of the print sheet being folded back, a binding margin may sometimes be formed at the folded portion. For example, in the bookbinding technique, there has been known a technique of forming a binding margin at the folded portion, since the bookbinding has a feature that the sheet is bound at the folded portion.

On the other hand, when the hanging advertising poster is printed by using the folding two-sided print, the poster is not always hung down at the folded portion. Therefore, it is required that a binding margin is set at the portion, such as the portion for hanging the sheet, other than the folded portion. In the hanging advertising poster, a clip member, which is used as a substitute for a weight, may be set at the lower portion, which is opposite to the hanging portion. In this case, it is required that the binding margin is set at the lower portion opposite to the hanging portion.

A roll sheet is mostly used for the print sheet for forming the hanging advertising poster described above. The width of the roll sheet is fixed, but its length can freely be changed. Therefore, posters of various sizes can be formed according to the direction of a document.

FIGS. 9A, 9B, 9C, and 9D illustrate a roll sheet on which a print image having a binding margin set thereto is printed. FIG. 9A illustrates a poster whose long side is the same as a half of the width of the roll sheet, FIG. 9B illustrates a poster whose short side is the same as a half of the width of the roll sheet, FIG. 9C illustrates a poster whose long side is equal to the width of the roll sheet, and FIG. 9D illustrates a poster whose short side is equal to the width of the roll sheet.

However, when a poster having the target size is formed, a user has to consider the direction of a document or a folded position according to the size in a conventional case, which is very troublesome. When a binding margin for the clip member used for hanging down the poster is set, a user has to consider a more complicated layout.

SUMMARY OF THE INVENTION

The present invention is directed to an image forming apparatus capable of automatically setting a binding margin according to a binding direction without a need of a complicated operation, when a print layout on the assumption of a folding is carried out.

According to an aspect of the present invention, a printing control method for printing an image onto a recording medium includes inputting data to be used for printing a page, setting a position and a size of a margin for a plurality of pages represented by the input data, according to an instruction from a user, and causing a print device to print an image including the plurality of pages and in which the margin with the set width is arranged at the set position, onto the recording medium in a direction according to the width of the margin.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C illustrate an example of a layout in which a bottom binding is set by a binding direction setting.

FIGS. 6A, 6B, and 6C illustrate an example of a layout in which a top binding is set by a binding direction setting.

DESCRIPTION OF THE EMBODIMENTS

Various exemplary embodiments, features, and aspects of the invention will be described in detail below with reference to the drawings.

Figure 1:
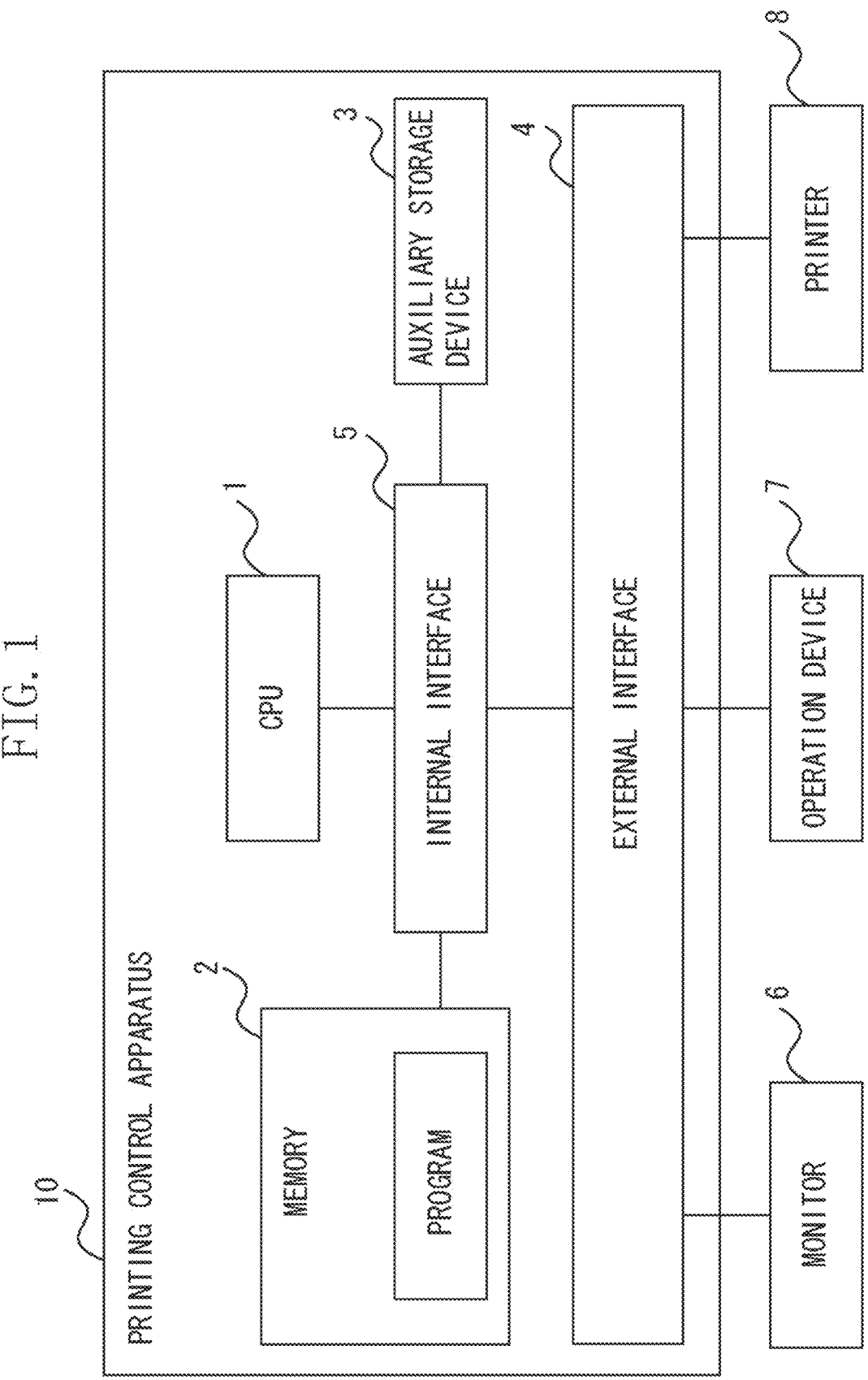
FIG. 1 is a block diagram illustrating a configuration of a printing control apparatus according to an exemplary embodiment of the present invention.

FIG. 1 is a block diagram illustrating a configuration of a printing control apparatus 10 according to the present exemplary embodiment. In the present exemplary embodiment, the printing control apparatus 10 executes a printing control method. The printing control apparatus 10 includes a central processing unit (CPU) 1, a memory 2, an auxiliary storage device 3 such as a hard disk drive, and an external interface 4, which are interconnected via an internal interface 5. The printing control apparatus 10 can also be connected to a monitor 6, an operation device 7 such as a mouse or a keyboard, and a printer 8 via the external interface 4.

The CPU 1 makes an instruction for processing to each unit, and performs various data processing, to control an entire system. The auxiliary storage device 3 has a program, which causes the CPU 1 to execute the content of the process, stored therein beforehand. The program is loaded into the memory 2 to execute the program. The CPU 1 executes the program loaded to the memory 2, thereby executing the control.

The monitor 6 is a display device such as a liquid crystal monitor and a cathode-ray tube (CRT) monitor. The CPU 1 causes the monitor 6 to display the operation guide to a user or a result of a layout of an image. When the user operates the operation device 7 such as a keyboard or a mouse, the operation content is input to the CPU 1 through the external interface 4 and the internal interface 5.

The CPU 1 can input the user's instruction through the operation device 7 to execute the control according to the operation content. The printer 8 can print an image onto a recording sheet based on the data input through the external interface.

Figure 2:
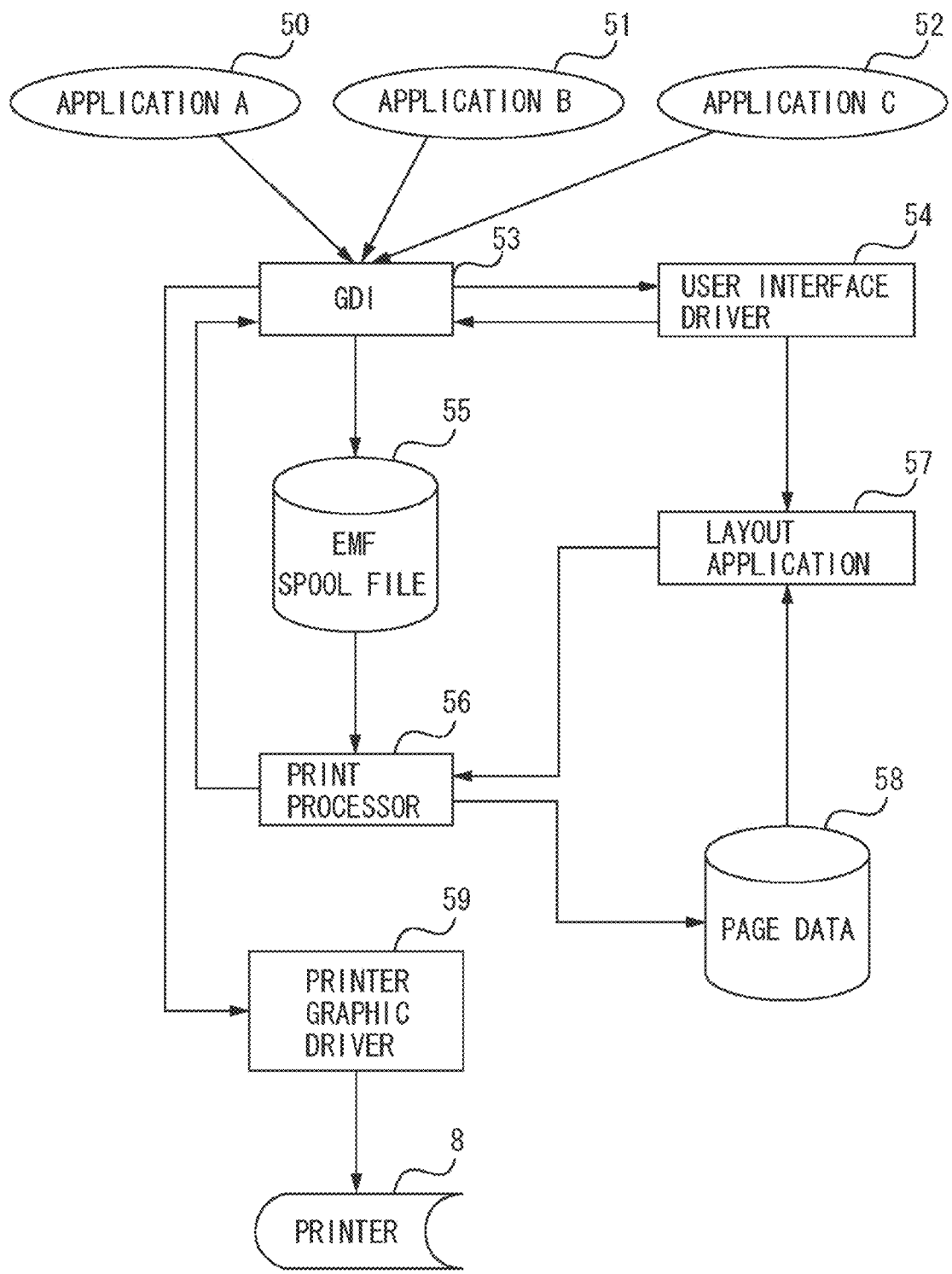
FIG. 2 illustrates a printing control in the printing control apparatus according to the exemplary embodiment of the present invention.

FIG. 2 illustrates a printing control in the printing control apparatus according to the present exemplary embodiment. Firstly, print data from a plurality of applications such as an application A50, an application B51, and an application C52, is input. The input print data is temporarily spooled as enhanced meta file (EMF) data into an EMF spool file 55. In this case, the input print data is spooled through a graphics device interface (GDI) 53.

The GDI 53 notifies the event such as a start and an end of the printing operation of a user interface driver 54 (printer driver UI). The user interface driver 54 starts a layout application 57 at the timing of the start of the printing operation.

When the spool to the EMF spool file 55 is completed, the GDI 53 notifies the completion of the spool of the user interface driver 54, and at the same time, requests the printing operation to a print processor 56. When receiving this request, the print processor 56 generates page data 58, which is the print data per a page unit, from the EMF spool file. Then, the print processor 56 deletes the EMF spool file 55, and performs a pseudo completion process for a print request is performed to the GDI 53.

Thus, the GDI 53 can accept the printing operation from the other application. In this way, the page data can be generated from the plurality of applications.

The layout application 57 performs an edition of a print layout. When the page data 58 is generated, the layout application 57 displays the page data 58 onto the application, and waits for the instruction of the print layout from a user. The layout application 57 has a function of combining the selected page data pieces. When the user's instruction is input, the layout application 57 combines two pages in a predetermined order into one set, for example. The layout application 57 also has a function of setting a binding margin. It can set a binding margin according to the user's instruction.

When the edition of the print layout according to the user's instruction is completed at the layout application 57, the printing operation is executed. In this case, the layout application 57 requests the printing operation to the print processor 56.

The print processor 56 executes again the spooled EMF data, considering the edition of the print layout for the page data 58. Then, the print processor 56 gives an instruction of the printing operation to a printer graphic driver 59 through the GDI 53. The printer graphic driver 59 converts the EMF data into a command that can be interpreted by the printer 8, and outputs the resultant.

The data to be printed is accepted from a plurality of applications, and the layout of the page based on these data pieces is determined at the layout application 57 by the system illustrated in FIG. 2. Then, an image obtained by combining the plurality of pages is printed, reflecting the layout thereon. By virtue of this process, the print image that appears as a pseudo two-sided print when it is folded back can be formed.

Incidentally, printer data for a folded two-sided print may be generated by the printer driver. However, the present embodiment can be better than the printer driver in that a plurality of applications may be designated as a print target.

Figure 3:
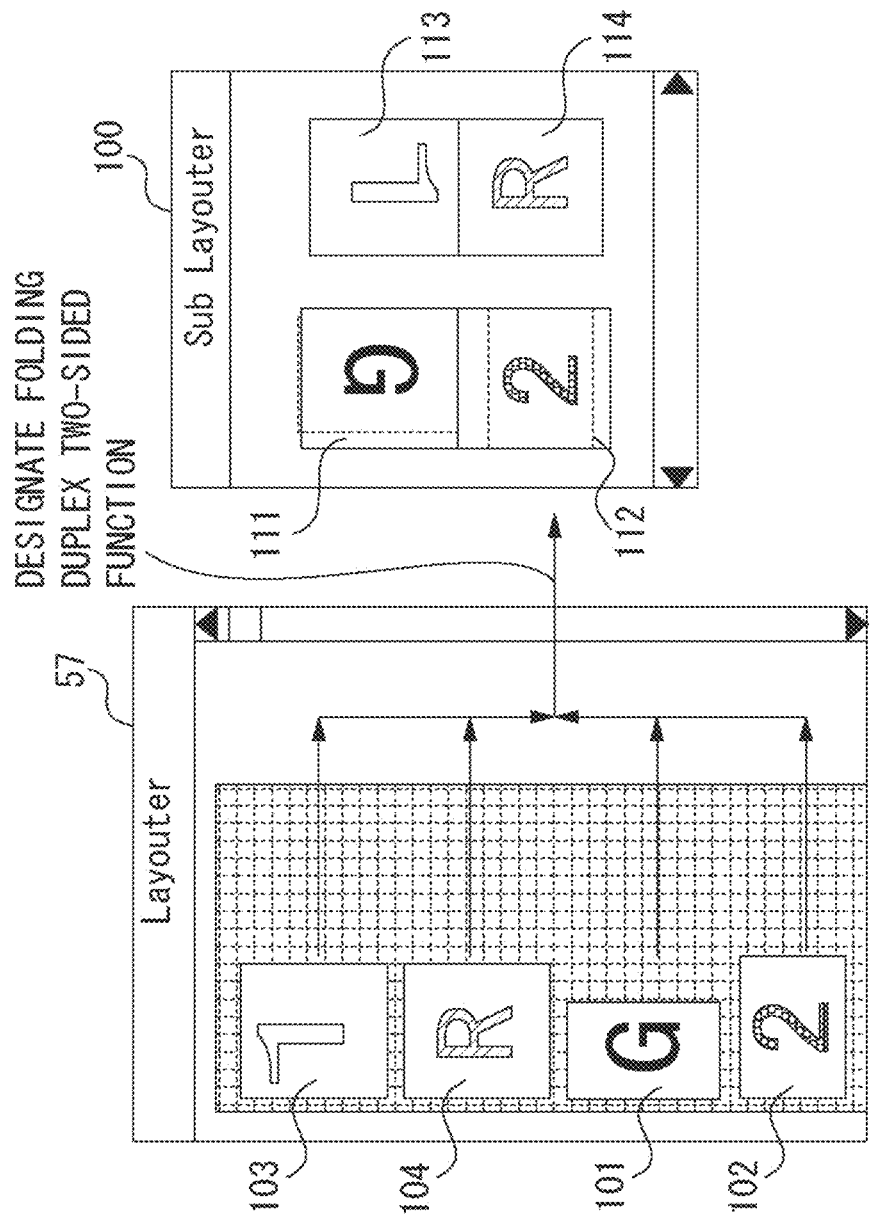
FIG. 3 illustrates an outline of a process of a layout application.

FIG. 3 illustrates an outline of a process by the layout application 57. The layout application 57 edits the print layout.

The layout application 57 accepts a plurality of page data pieces (101, 102, 103, 104) from the plurality of applications such as the application A50, the application B51, and the application C52, through the GDI 53. The layout application 57 displays thereon the accepted plurality of page data pieced as a layout.

A user selects the page data pieces in the order of 101, 102, 103, and 104 on the layout application 57, and then, designates a folding two-sided function for executing a folded two-sided print. The folding two-sided function may be designated by a user by selecting a menu (not illustrated) on the layout application 57, a tool bar icon (not illustrated), or the like.

When the folding two-sided function is designated on the layout application 57, a folding two-sided generating sub-application 100 is started. The folding two-sided generating sub-application 100 determines the layout according to the direction and size of a binding margin designated by the user. The folding two-sided generating sub-application 100 combines two pages as one set in the selected order of the selected page data pieces according to the determined layout, thereby generating a print image for the folding two-sided print.

When generating the print image for the folding two-sided print, the folding two-sided generating sub-application 100 changes the magnification in such a manner that the size of the front page and the size of the back page becomes equal to each other when the print image is folded. The folding two-sided generating sub-application 100 also rotates one of the page data pieces, which are to be combined, at 180 degrees. In the example of FIG. 3, the head page data pieces (101 and 103) are rotated by 180 degrees.

As a result of this process, the page data pieces 101, 102, 103, and 104 are combined on the folding two-sided generating sub-application 100 in such a manner that the page data pieces 111 and 112 are combined and 113 and 114 are combined to form print images as the folding two-sided print.

A binding margin is formed on the print image at that time. More specifically, the print image, which is arranged with the layout where a plurality of pages, a folding line, and the binding margin are determined, is generated. The binding margin is not only newly added to the page, but also an area for a binding margin may be formed in the page.

The print image as the folding two-sided print is generated at the folding two-sided generating sub-application 100. However, the invention is not limited thereto. The print image as the folding two-sided print can be generated on the screen of the layout application 57.

Figure 4:
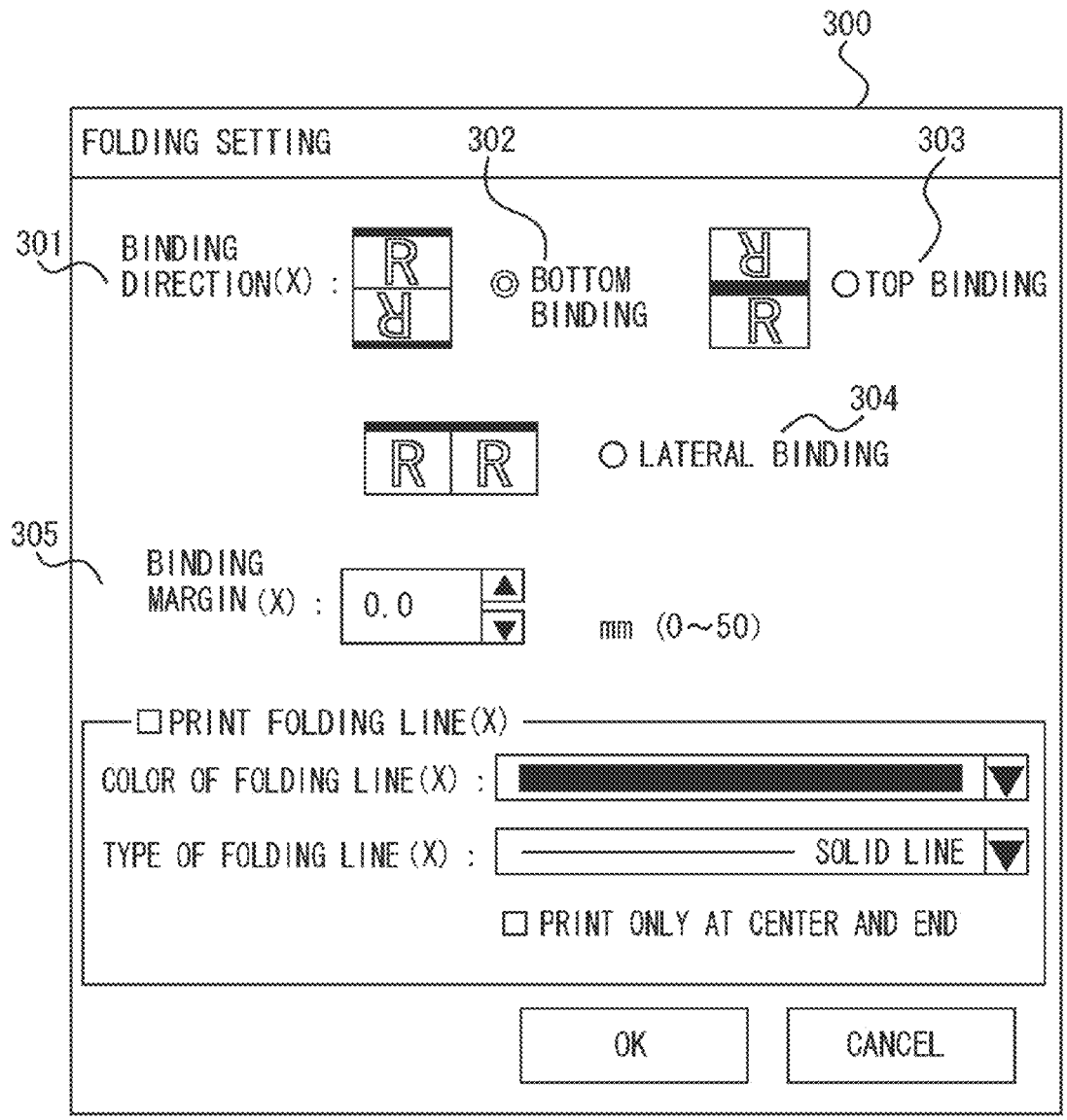
FIG. 4 illustrates one example of a folding setting in the layout application.

FIG. 4 illustrates one example of a folding setting in the layout application 57. A folding setting window 300 is started when it is designated from a menu on the layout application 57 or by a tool bar icon. The folding setting window 300 may be started through the designation on the folding two-sided generating sub-application 100.

The folding setting window 300 is provided with at least a binding direction setting 301 and a binding margin setting 305. The binding direction setting 301 can be set from among a bottom binding 302, a top binding 303, and a lateral binding 304. By the binding margin setting 305, a margin space formed as a binding margin at the position determined by the setting of the binding direction setting 301 can be set. In the example in FIG. 4, the margin space within the range of 0 mm to 50 mm can be set. When the margin space is set to be 0 mm, the binding margin is substantially not formed.

FIG. 5 is illustrates an example of the layout in which the bottom binding 302 is set by the binding direction setting 301. The bottom binding 302 is laid out for a print sheet 400 as illustrated in FIG. 5A or FIG. 5B. When the image having the layout described above is printed, a print image illustrated in FIG. 5C is formed, which becomes a pseudo two-sided print when it is folded back by a user. FIG. 5C illustrates a layout in which the print image is folded back at a folding line 405. A printed matter is obtained in which a front page 401 and a back page 402 are combined at the lower end of both pages when it is folded back by the user.

In this case, the binding margin 403 on the front page 401 and the binding margin 404 on the back page 402 need to be formed at the upper ends of the respective pages. Therefore, the binding margins 403 and 404 are formed at the position at the sheet end parallel to the folding line 405. In the print image that becomes the two-sided print when it is folded back, the pages may be reversed, regardless of which is the front page and which is the back page.

FIGS. 6A, 6B, and 6C illustrate an example of a layout in which the top binding 303 is set by the binding direction setting 301. The top binding 303 is laid out for the print sheet 400 as illustrated in FIG. 6A or FIG. 6B. When the image having the layout described above is printed, a print image illustrated in FIG. 6C is formed, which becomes a pseudo two-sided print when it is folded back by a user.

FIG. 6C illustrates the layout in which the print image is folded back at a folding line 505. A printed matter is obtained in which a front page 501 and a back page 502 are combined at the upper end of both pages when it is folded back by the user. In this case, the binding margin 503 on the front page 501 and the binding margin 504 on the back page 502 need to be formed at the upper ends of the respective pages. Therefore, the binding margins 503 and 504 are formed at the same position as the folding line 505.

In the print image that becomes the two-sided print when it is folded back, the pages may be reversed, regardless of which is the front page and which is the back page.

Figure 7A:
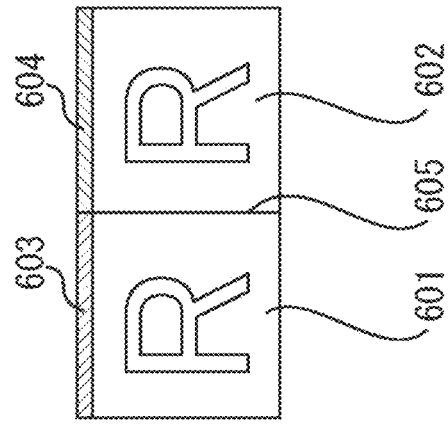
FIGS. 7A, 7B, and 7C illustrate an example of a layout in which a lateral binding is set by a binding direction setting.
Figure 7B:
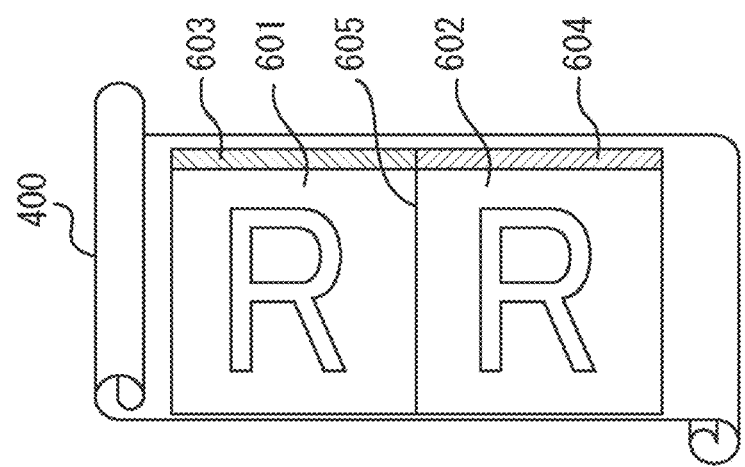
Figure 7C:
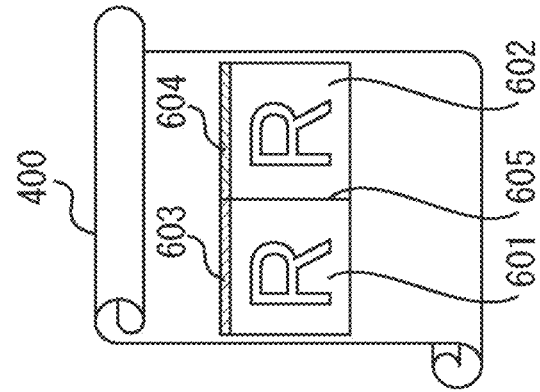

FIGS. 7A, 7B, 7C illustrate an example of the layout in which the lateral binding 304 is set by the binding direction setting 301. The lateral binding 304 is laid out for the print sheet 400 as illustrated in FIG. 7A or FIG. 7B.

When the image having the layout described above is printed, a print image illustrated in FIG. 7C is formed, which becomes a pseudo two-sided print when it is folded back by a user. FIG. 7C illustrates the layout in which the print image is folded back at a folding line 605. A printed matter is obtained in which a front page 601 and a back page 602 are combined at the right end of the front page 601 and the left end of the back page 602 at the folding line 605 when it is folded back by the user.

In this case, the binding margin 603 on the front page 601 and the binding margin 604 on the back page 602 need to be formed at the upper ends of the respective pages. Therefore, the binding margins 603 and 604 are formed at the upper end of the sheet vertical to the folding line 605. In the print image that becomes the two-sided print when it is folded back, the pages may be reversed, regardless of which is the front page and which is the back page.

As described above with reference to FIGS. 5A, 5B, 5C, 6A, 6B, 6C, 7A, 7B, and 7C, the position of the binding margin is automatically determined as in FIGS. 5C, 6C, and 7C, according to the selected binding direction by the binding direction setting 301, i.e., according to the bottom binding 302, the top binding 303, or the lateral binding 304. As illustrated in FIGS. 5A and 5B, the direction of the image to be printed to the carrying direction of the roll sheet is changed in two ways according to the size of the page. In the present exemplary embodiment, the direction of the print image to the carrying direction of the roll sheet is changed according to not only the size of the page but also the size of the binding margin.

When an image is printed on a sheet other than the roll sheet, such as the sheet having a fixed aspect ratio, as in a conventional case, the size of the image is not changed. On the other hand, in the case of the roll sheet, the size of the binding margin does not affect the printing direction, when the binding margin is formed as illustrated in FIG. 5A.

However, when the binding margin is formed as illustrated in FIG. 5B, if the binding margin is large, the binding margin does not fall within the roll sheet. Accordingly, the direction of the print image to the roll sheet is automatically changed between the direction illustrated in FIG. 5A and the direction illustrated in FIG. 5B.

Figure 8A:
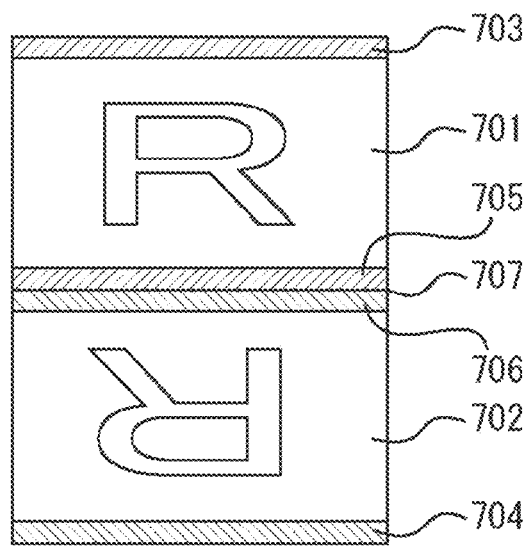
FIGS. 8A, 8B, and 8C illustrate an example of a layout in which a binding margin is formed at an upper and lower ends of a print image.
Figure 8B:
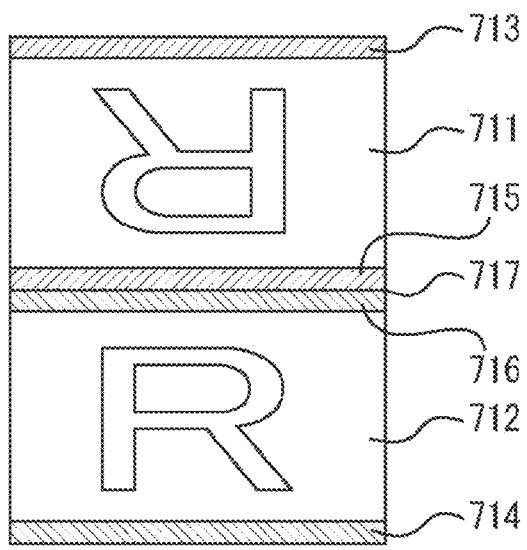
Figure 8C:
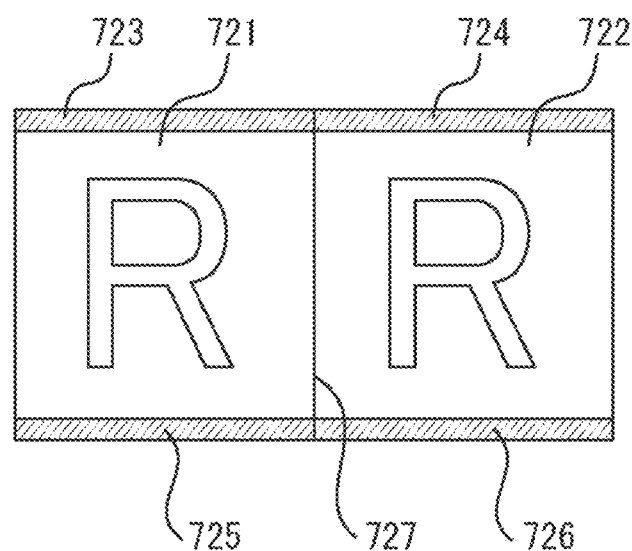
Figure 9A:
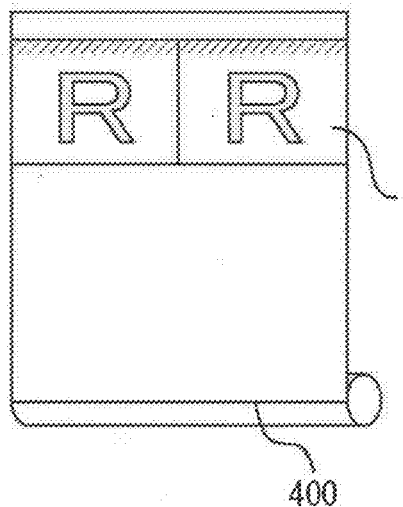
FIGS. 9A, 9B, 9C and 9D illustrate a roll sheet on which a print image having a binding margin set is printed.
Figure 9B:
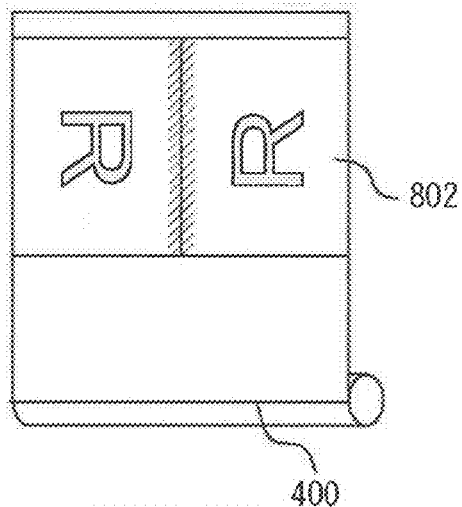
Figure 9C:
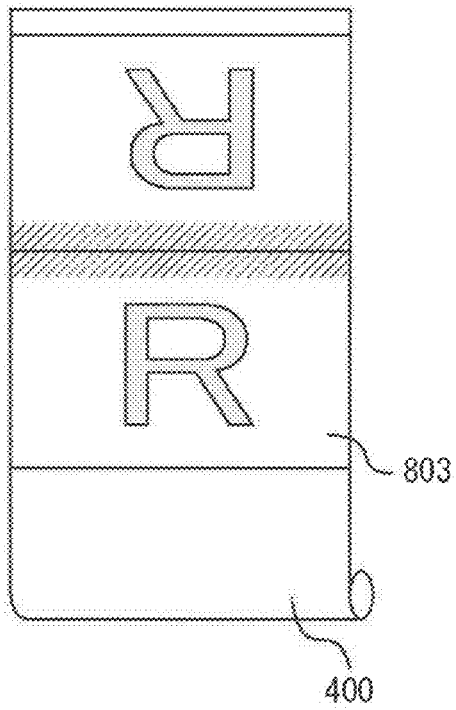
Figure 9D:
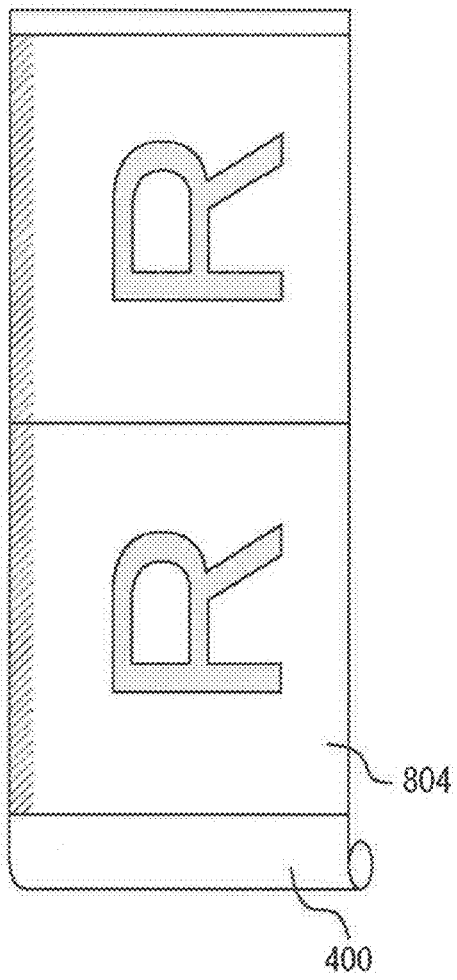

FIGS. 8A, 8B, and 8C illustrate examples of the layout in which the binding margin is formed at upper and lower ends of the print image. FIG. 8A illustrates the case in which the binding margin is formed at upper and lower ends of the print image illustrated in FIG. 5C, which is the pseudo two-sided print when the print image is folded back, and which is produced when the bottom binding 302 is set in the binding direction setting 301.

In FIG. 8A, when the print image is folded back at a folding line 707, the binding margins are formed at upper-end binding-margin positions 703 and 704, and at lower-end binding-margin positions 705 and 706.

FIG. 8B illustrates the case in which the binding margin is formed at upper and lower ends of the print image illustrated in FIG. 6C, which is the pseudo two-sided print when the print image is folded back, and which is produced when the top binding 303 is set in the binding direction setting 301. In FIG. 8B, when the print image is folded back at a folding line 717, the binding margins are formed at upper-end binding-margin positions 715 and 716, and at lower-end binding-margin positions 713 and 714.

FIG. 8C illustrates the case in which the binding margin is formed at upper and lower ends of the print image illustrated in FIG. 7C, which is the pseudo two-sided print when the print image is folded back, and which is produced when the lateral binding 304 is set in the binding direction setting 301. In FIG. 8C, when the print image is folded back at a folding line 727, the binding margins are formed at upper-end binding-margin positions 723 and 724, and at lower-end binding-margin positions 725 and 726. The binding margin at the upper end is utilized for hanging down the print image, while the binding margin at the lower end is utilized for a clip member, which is used for stabilizing the condition of the print image that is hung down.

In the present exemplary embodiment, only one binding margin setting 305 is provided on the folding setting window 300. However, the setting items including the item for the upper-end binding margin and the item for the lower-end binding margin may be provided to set the upper-end and the lower-end binding margins with the independent size respectively.

In this case, if 0 mm is set for the item for the upper-end binding margin and the item for the lower-end binding margin respectively, the binging margins are not formed at both ends. Alternatively, the setting item (not illustrated) for designating whether the binding margin is set at the lower end may be provided, and thereby the changeover between the print images in FIG. 8A and FIG. 5C, between the print images in FIG. 8B and FIG. 6C, and between the print images in FIG. 8C and FIG. 7C may be performed.

The exemplary embodiment described above illustrates the printing control for the print device in the printing control apparatus. However, the present invention is not limited thereto. A system including a plurality of devices may execute the printing control. In the above description, the roll sheet is used as an example of the recording sheet. However, the present invention is not limited thereto. The present invention is applicable to the case in which a printing operation is executed for a cut sheet.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method performed by at least one processor, the method comprising:
    displaying concurrently, in a same window in a display device, a first display item indicating a first folding pattern for folding a recording medium and a second display item indicating a second folding pattern for folding the recording medium;
    causing, if the first display item is designated, a print device to print first data in a first page and second data in a second page on one side of the recording medium, so that a top-bottom direction of the first page is opposite to a top-bottom direction of the second page and that each of the first page and the second page is arranged such that the recording medium is to be folded on a bottom end of each of the first page and the second page; and
    causing, if the second display item is designated, the print device to print the first data in the first page and the second data in the second page on the one side of the recording medium, so that the top-bottom direction of the first page is opposite to the top-bottom direction of the second page and that each of the first page and the second page is arranged such that the recording medium is to be folded on a top end of each of the first page and the second page.

2. The method according to claim 1, wherein in a case where a third display item corresponding to a different folding pattern from the first folding pattern and the second folding pattern is designated, the first data and the second data are printed, so that a top-bottom direction of the first page coincides with a top-bottom direction of the second page.

3. The method according to claim 1, further comprising setting addition of a margin, according to an instruction by a user;
    wherein if the addition of a margin is set, the first data and the second data are printed, so that the margin is added on a top end of the first page and the second page.

4. The method according to claim 3, wherein the first data and the second data are printed in a direction with respect to the recording medium, according to a size of the margin and a size of each of the first page and the second page.

5. The method according to claim 3, wherein a margin size is set according to an instruction by the user, and in a case where the margin size is set to 0, a setting of the addition of no margin is executed, and in a case where the margin size larger than 0 is set, the setting of the addition of a margin is executed.

6. The method according to claim 3,
    wherein if the first display item or the second display item is designated and the addition of a margin is not set, a margin is not added to the first page or the second page of a predetermined size on the one side of the recording medium, and
    wherein, if the first display item or the second display item is designated and the addition of a margin is set, the margin is added on the top end of each of the first page and the second page of the predetermined size on the one side of the recording medium.

7. The method according to claim 1, further comprising inputting the first data from a first application and the second data from a second application different from the first application.

8. The method according to claim 1, further comprising:
    changing a magnification of the first data according to the second page, and
    causing the print device to print the first data of which the magnification is changed, and the second data.

9. The method according to claim 8, wherein the magnification of the first data is changed so that sizes of the first page and the second page are identical on the one side of the recording medium.

10. The method according to claim 1, wherein the first data and the second data are printed on one side of a continuous sheet by the print device.

11. The method according to claim 1, wherein information indicating a folding line at which the recording medium is folded, is further printed on the one side of the recording medium by the print device.

12. The method according to claim 1, wherein the displaying of the first display item and the second display item the first display item and the second display item is performed by the at least one processor executing a printer driver.

13. The method according to claim 1, wherein the designating displaying of the first display item and the second display item a folding pattern is performed by the at least one processor executing an application.

14. The method according to claim 1, further comprising rotating the first data or the second data automatically, so that the top-bottom direction of the first page is opposite to the top-bottom direction of the second page, wherein the first data and the second data are printed after the rotation is executed.

15. A non-transitory computer-readable recording medium having recorded thereon a program for allowing a computer to execute the method according to claim 1.

16. The recording medium according to claim 15, wherein the program is a printer driver.

17. A method performed by at least one processor, the method comprising:
displaying concurrently, in a same window in a display device, a first display item indicating a first folding pattern for folding a recording medium and a second display item indicating a second folding pattern for folding the recording medium;
causing, if the first display item is designated, the display device to display a first display screen in which first data in a first page and second data in a second page are laid out so that a top-bottom direction of the first page is opposite to a top-bottom direction of the second page and that a bottom end of each of the first page and the second page is arranged such that the recording medium is to be folded on a bottom end of each of the first page and the second page; and
causing, if the second display item is designated, the display device to display a second display screen in which the first data in the first page and the second data in the second page on the one side of the recording medium, so that the top-bottom direction of the first page is opposite to the top-bottom direction of the second page and that each of the first page and the second page is arranged such that the recording medium is to be folded on a top end of each of the first page and the second page.

18. The method according to claim 17, further comprising causing a print device to print the first data and the second data, so that the first data and the second data are laid out on one side of the recording medium in the similar manner as a layout of the first data and the second data in the first display screen or the second display screen.

19. A non-transitory computer-readable recording medium having recorded thereon a program for allowing a computer to execute the method according to claim 17.

20. The recording medium according to claim 19, wherein the program is a printer driver.

21. The recording medium according to claim 19, wherein the program is an application.

22. An apparatus comprising:
a processor; and
a memory configured to store at least one program executed by the processor,
wherein the processor causes, by executing the at least one program, a display device to display concurrently, in a same window in the display device, a first display item indicating a first folding pattern for folding a recording medium and a second display item indicating a second folding pattern for folding the recording medium,
wherein the processor causes, by executing the at least one program, a print device to print first data in a first page and second data in a second page on one side of the recording medium, so that a top-bottom direction of the first page is opposite to a top-bottom direction of the second page and that each of the first page and the second page is arranged such that the recording medium is to be folded on a bottom end of each of the first page and the second page, if the first display item is designated, and
wherein the processor causes, by executing the at least one program, the print device to print the first data in the first page and the second data in the second page on the one side of the recording medium, so that a top-bottom direction of the first page is opposite to a top-bottom direction of the second page and that each of the first page and the second page is arranged so as to be folded on a top end of each of the first page and the second page, if the second display item is designated.

23. The apparatus according to claim 22, wherein the at least one program includes a printer driver, and the displaying is performed by the processor executing the printer driver.

24. An apparatus comprising:
a processor; and
a memory configured to store at least one program executed by the processor,
wherein the processor causes, by executing the at least one program, a display device to display concurrently, in a same window in the display device, a first display item indicating a first folding pattern for folding a recording medium and a second display item indicating a second folding pattern for folding the recording medium,
wherein the processor causes, by executing the at least one program, the display device to display a first display screen in which first data in a first page and second data in a second page are laid out so that a top-bottom direction of the first page is opposite to a top-bottom direction of the second page and that each of the first page and the second page is arranged such that the recording medium is to be folded on a bottom end of each of the first page and the second page, if the first display item is designated, and
wherein the processor causes, by executing the at least one program, the display device to display a second display screen in which first data in a first page and second data in a second page are laid out so that a top-bottom direction of the first page is opposite to a top-bottom direction of the second page, and that each of the first page and the second page is arranged so as to be folded on a top end of each of the first page and the second page, if the second display item is designated.

25. The apparatus according to claim 24, wherein the at least one program includes a printer driver, and the displaying is performed by the processor executing the printer driver.

* * * * *